May 19, 1953 C. M. TATOSIAN 2,639,046
AUTOMOBILE PARKING DEVICE
Filed April 29, 1949 3 Sheets-Sheet 1
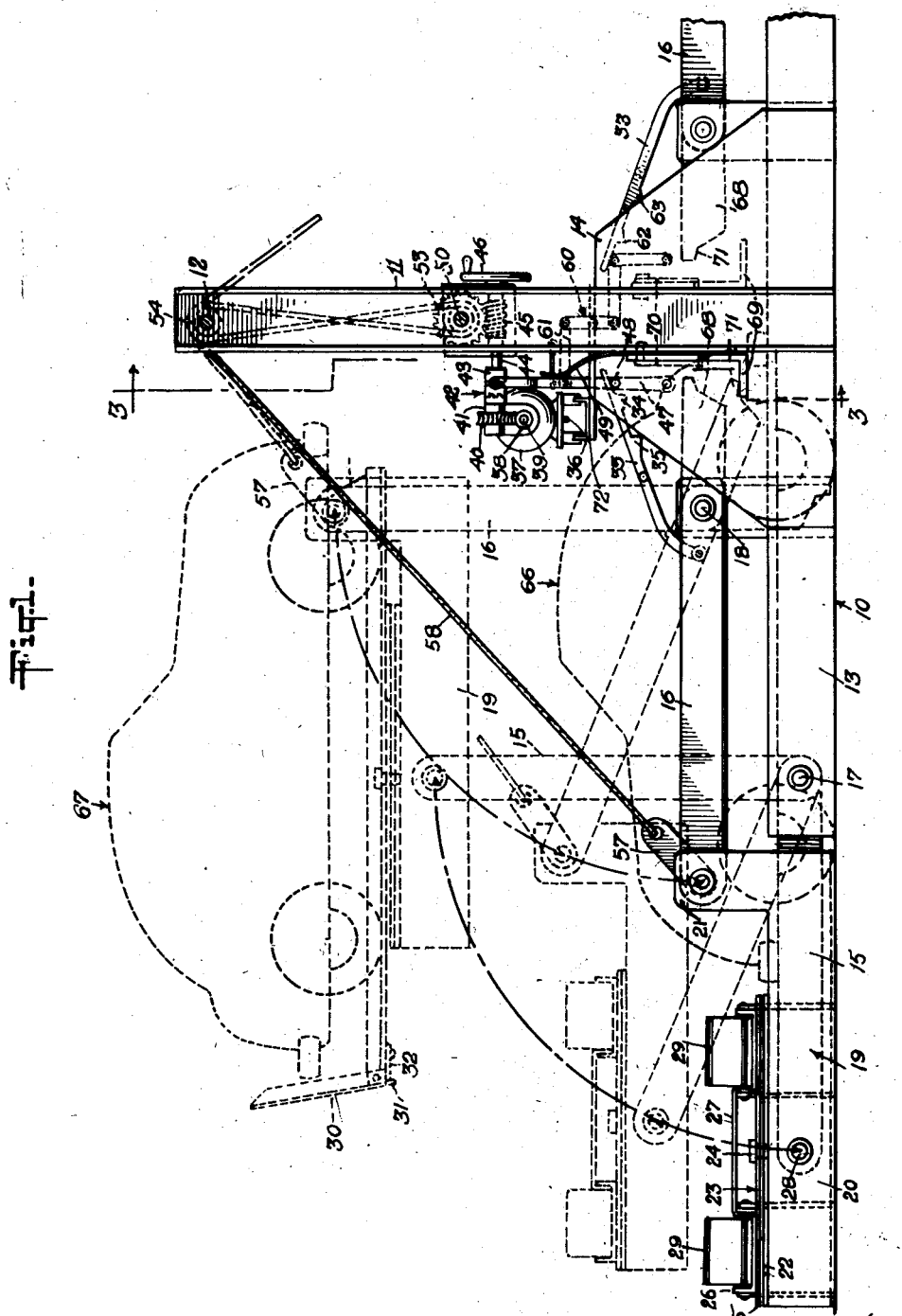
Inventor
Charles M. Tatosian
By
Munn, Liddy & Glaccum
Attorneys

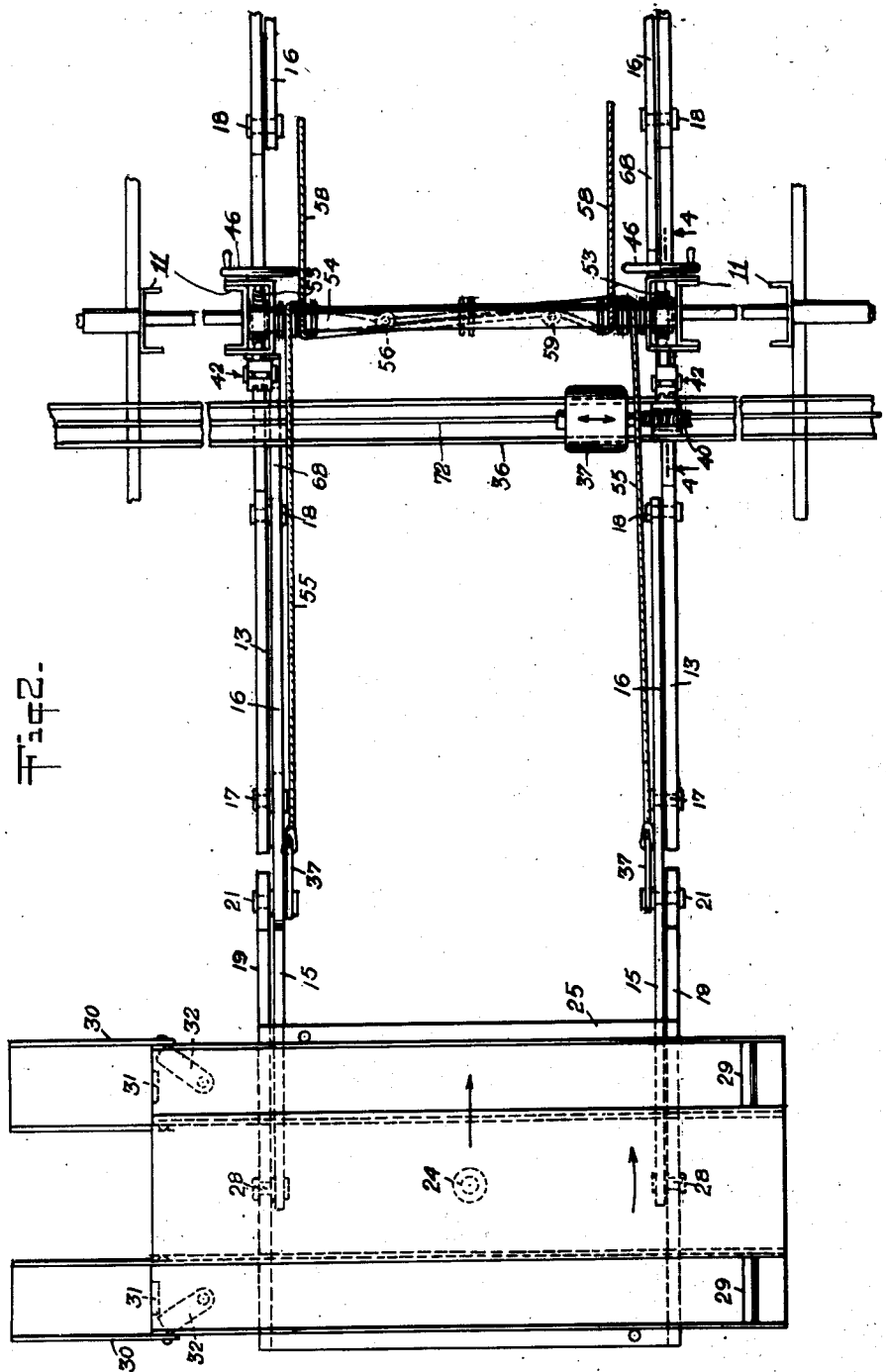

May 19, 1953  C. M. TATOSIAN  2,639,046
AUTOMOBILE PARKING DEVICE
Filed April 29, 1949  3 Sheets-Sheet 3
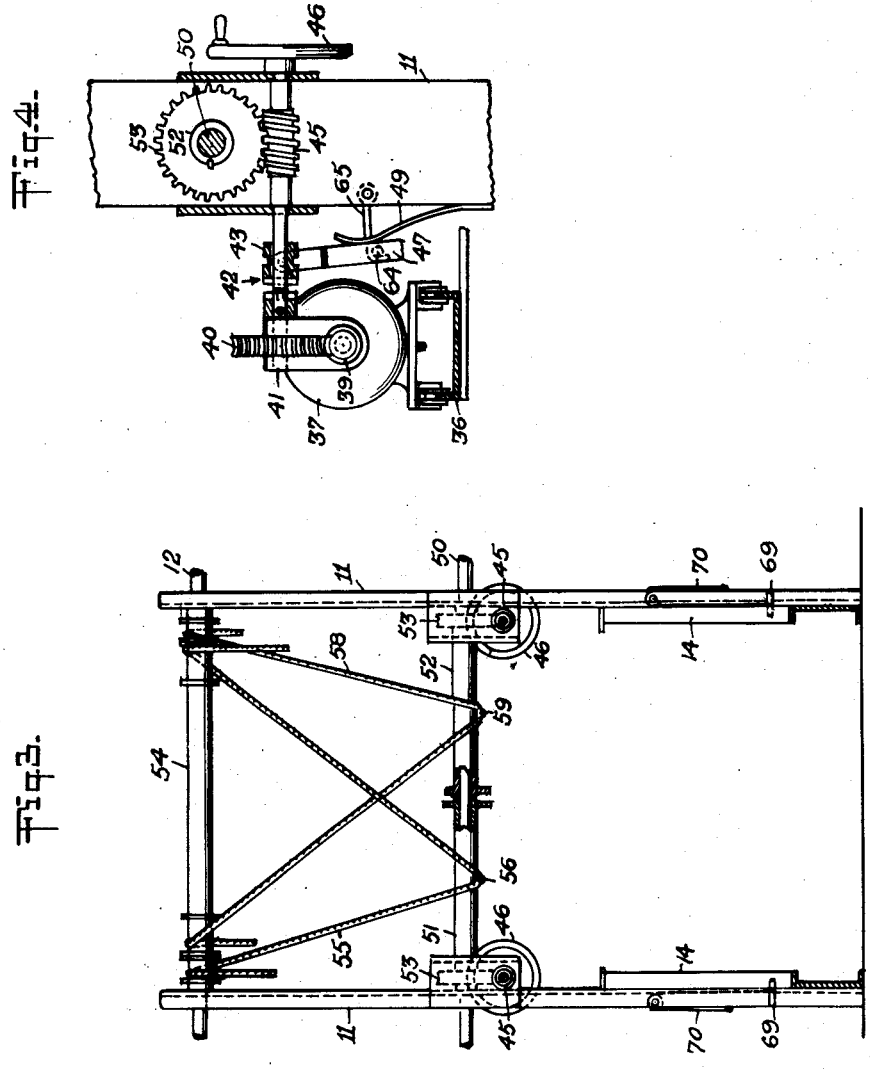
Inventor
Charles M. Tatosian
By
Munn, Liddy & Glaccum
Attorneys Patented May 19, 1953

2,639,046

UNITED STATES PATENT OFFICE 2,639,046

AUTOMOBILE PARKING DEVICE

Charles Magar Tatosian, New York, N. Y.

Application April 29, 1949, Serial No. 90,368

1 Claim. (Cl. 214—16.1)

This invention relates to a parking or storing device for automobiles and like vehicles.

An object of this invention is to provide a frame structure and a platform, which platform is movable in an arc between a lowered position and raised position, for raising an automobile or like vehicle, the platform proper having channels thereon for cradling the automobile.

A further object of the invention is to provide additional space for the storage of automobiles whereby two automobiles may be parked in substantially the same space taken by one automobile by parking one automobile on the ground within the frame, and parking another automobile on a movable platform and raising the platform over the first automobile.

Another object of the invention is to provide a device whereby either the automobile parked on the ground or the automobile parked on the raised platform can be driven away or parked without disturbing the other automobile. Thus, in a parking lot or garage, automobiles to be parked for longer periods can be placed on these platforms and raised, and automobiles parked for shorter periods of time can be placed on the ground levels.

A still further object of the invention is to provide a device whereby the automobile to be parked on the raised platform can be driven on to the cradle at right angles to the position it will occupy when parked, thus saving the space normally required for a wide aisle to allow for the swinging of the automobile into the position it will occupy when parked.

Another object of the invention is to enable the lifting operation to be accomplished manually or by a motor and to utilize one motor for the operation of a platform on either side of the device and for the operation of a series of the devices.

With these and other objects in view, the invention consists in certain novel features of construction and combination which will be more fully hereinafter described and pointed out in the claim.

In the accompanying drawings—

Fig. 1 is a side view of the parking device showing, in dotted lines, an automobile parked on the ground level and an automobile parked on the raised platform, and also showing in dotted lines the platform in an intermediate raised position and in a fully raised position;

Fig. 2 is a plan view;

Fig. 3 is a vertical section taken on line 3—3 of Fig. 1; and

Fig. 4 is an enlarged vertical section taken on line 4—4 of Fig. 2.

Referring to the accompanying drawings by numerals, 10 indicates a frame structure comprising two vertical channel members 11 held in spaced relationship to each other by the rod 12; two base channel members 13, two plates 14 connecting each base channel member with a vertical channel member; two lower radial arms 15 and two upper radial arms 16, which radial arms are of equal length and are pivoted in the same relative positions, each lower radial arm being pivotally attached to one of the base channel members 13 at 17, and each upper radial arm being pivotally attached at 18 to an extension of member 13.

19 indicates a movable platform comprising a pair of side rails 20 having an extension 21, a bed plate 22 mounted on said side rails and holding them in spaced relationship, and a vehicle cradle 23 turnably mounted on said platform by means of the pivot 24. The vehicle cradle 23 consists of a plate 25, a pair of channeled cradle members 26 mounted on the plate 25, and a flanged cover 27 affixed to the channeled cradle members.

A lower radial arm 15 is pivotally affixed to each of the side rails 20 at 28, and an upper radial arm 16 is pivotally affixed to each of the extensions 21 of the side rails 20. A stop 29 is mounted in the front end of each of the channeled cradle members 26. The ramp 30 is hingedly attached to the rear end of each of the channeled cradle members 26. These ramps have a lug 31 at one end thereof which abuts the latch 32 which is pivotally mounted on the bottom of each of the channeled cradle members; when the ramp is raised and the latch is pivoted inwardly, preventing the lowering of the ramp.

Pivotally mounted on one of the upper radial arms 16 is an automatic stop arm 33 having lugs 34 and 35. Supported by one of the vertical channel members 11 is a track 36 on which is carried a motor 37. A worm 38 is mounted on the motor shaft 39. The worm engages the worm wheel 40. One member 41 of the clutch 42 engages said worm wheel 40. On each of the vertical channel members 11 is mounted the other clutch member 43, the wheel shaft 44, the worm 45 and the crank wheel 46. On each of the plates 14 are pivotally mounted a clutch fork 47 engaging the clutch member 43. This clutch fork 47 has a lug 48. To each vertical channel member 11 is affixed a spring 49.

As shown in Fig. 3, the shaft 50 is supported by the vertical channel members 11, and mounted on said shaft 50 are two hollow shafts 51 and 52. A worm wheel 53 is fixedly mounted on each of these hollow shafts 51 and 52 and engages the worm 45. Mounted on the connecting rod 12 is another hollow shaft 54. One cable 55 has its bight 56 affixed to the hollow shaft 51. Each end of this cable is tied to a link 57 which, in turn, is pivotally mounted on each of the extensions 21 of the side rails 20.

A duplicate movable platform and turnable vehicle cradle may be used in conjunction with and on the opposite side of the frame structure 10. Where there is such duplicate use, the ends of the cable 58, the bight 59 of which is attached to the hollow shaft 52, would be tied to links which, in turn, would be pivotally mounted on the duplicate extensions 21 of the duplicate side rails 20. Where there is such duplication, the thrust of the automatic stop arm, being in the direction opposite to that heretofore described, in place of the action of the lugs 35 and 34 against the lug 48 there would be used the links 60, the last one of which, 61, would be affixed to the duplicate clutch fork so that the pressure of the lugs 62 and 63 against the pin 64 would cause a movement of the link 61 away from the duplicate clutch fork, pulling the duplicate clutch fork and, in turn, disengaging the duplicate clutch member 42 from the duplicate clutch member 41. A hook 65 holds the clutch in disengagement, when desired.

These parking devices may also be placed in series with a common track 36 and a common shaft 50.

66 indicates the automobile parked on the ground level and 67 indicates the automobile parked on the raised platform.

In operation, the turnable vehicle cradle is swung to a position at right angles to the movable platform with the ramps in their lowered position. The automobile 67 is then driven onto the turnable vehicle cradle and the ramps locked in raised position. The motor is started and the clutch members 41 and 43 being in engagement, the wheel shaft 44 turns the worm 45 which, in turn, turns the worm wheel 53 rotating the hollow shaft 51. The hollow shaft 54, acting as a roller or pulley, the cable 55 is wound around the hollow shaft 51 raising the side rails 20. The movement of these side rails being limited by the radial arms 15 and 16, the platform 19 with the turnable vehicle cradle thereon, is raised while horizontally disposed in an arcuate path. With the raising of the movable platform and the arcuate movement of the upper radial arm, the automatic stop arm 33 is pushed in the direction of the vertical channel member until the lug 34 presses against the lug 48. The pressure of the lug 34 against the lug 48 pushes the clutch fork, overcoming the thrust of the spring 49 and disengaging clutch member 41 from the clutch member 43, thus stopping the turning of the hollow shaft 51 and the upward movement of the platform and turnable vehicle cradle mounted thereon. When the movable platform and turnable vehicle cradle has been raised in this intermediate position, and further movement stopped, the vehicle cradle is then turned 90° so that it is in alignment with the movable platform. The vehicle cradle cannot be turned before it has been raised to this intermediate position, because it must be high enough so that when it is turned it clears the front end of an automobile that may be parked on the ground level. This is the purpose of the automatic stop. After the automobile 67 has been swung around, the automatic stop arm is raised and disengaged from the lug 48. The motor having been in operation during this period, the thrust of the spring 49 pushes the clutch fork towards the motor causing the clutch member 43 to engage the clutch member 41 and the continuation of the raising of the movable platform until the radial arms are in a vertical position and the platform is completely raised, at which time the lug 35 on the automatic stop arm 33, coacting with the clutch fork in the same manner as the lug 34 as heretofore described, causes the disengagement of the clutch members 41 and 43 from each other and the cessation of the pulling force of the cables, the motor is then turned off. With the platform in the raised position, it is simple to drive the automobile 66 in or out of the frame structure 10.

It will be noted that the worm 45 acts as a brake on the worm wheel 53. When it is desired to lower the platform, the wheel shaft 44 is manually turned by means of the crank wheel 46 in a direction opposite to the direction which it takes when the motor causes the wheel shaft 44 to turn. When the platform is lowered to the intermediate position, the vehicle cradle is swung to a position where it is at right angles to the platform and the lowering operation continued until the platform is on the ground; when the ramps are lowered. An automobile can then be driven off the vehicle cradle or onto it. If there is a duplicate movable platform and turnable vehicle cradle on the other side of the frame structure and it is desired to raise such duplicate platform, the motor is simply moved along the track 36 until the clutch member 41 engages the other clutch member 43 and a similar operation takes place.

If desired, the platform can be raised manually rather than by the use of the motor, by turning crank wheel 46.

An additional means of automatically stopping the upward motion of the platform, supplementing the automatic stop arm 33, is to be noted. One of the upper radial arms 16 has an extension 68 and there is affixed to the vertical channel member 11 a latch 69 which is activated by the spring 70. The latch 69 is pivotally mounted on the vertical channel member 11 and normally lies in a vertical position. The spring 70 connects the vertical channel member 11 and the latch 69, and will return the latch 69 to its normal vertical position after the latch has been outwardly pulled. In operation, when the platform is raised from the ground level this upper radial arm 16, being pivoted at 18, the extension 68 is lowered and the ledge 71 of said extension 68 abuts the latch 69 preventing further movement of the upper radial arms and, consequently, further upward movement of the platform. After the vehicle cradle is swung into alignment with the platform as described above, the latch 69 is pulled outwardly so that it becomes disengaged from the ledge 71 allowing the further upward movement of the platform and vehicle cradle, as described above. The latch 69, having swung back into place by reason of the action of the spring 70, when the vehicle cradle is lowered the extension 68 and the ledge 71 of said extension swing upwardly and said ledge 71 comes into contact with the bottom of the latch 69 preventing further downward movement of the vehicle cradle until the latch 69 is pulled outwardly as described above. In this way, there is an automatic stop to the lowering of the vehicle cradle at a predetermined point so that the vehicle cradle may be swung at right angles to the platform above and without hitting the front of any vehicle that may be parked on the ground level.

It is further to be noted that a cable 72 is provided by which the motor 37 can be moved along the track 36.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of the appended claim.

I claim:

A vehicle parking device comprising a frame structure, a platform connected to said frame structure, a vehicle cradle turnably mounted on said platform, said cradle adapted to turn through at least 90°, a plurality of radial arms pivotally connected at opposite ends to said platform and frame structure, electro-mechanical means to raise and lower said platform in an arcuate path while maintaining said platform horizontal during such movement, said electro-mechanical means including an electric motor, a clutch and a clutch fork, said electric motor and clutch fork each being operatively connected to said clutch, and an automatic stop arm engaging said clutch fork and pivotally mounted on one of said radial arms and so disposed that after a predetermined movement of said radial arm said stop arm actuates said clutch fork which in turn disengages the clutch.

CHARLES MAGAR TATOSIAN.

References Cited in the file of this patent

UNITED STATES PATENTS

| Number | Name | Date |
|---|---|---|
| 1,524,505 | Blue | Jan. 27, 1925 |

FOREIGN PATENTS

| Number | Country | Date |
|---|---|---|
| 713,424 | France | Aug. 11, 1931 |
| 582,304 | Germany | Aug. 14, 1933 |
| 166,889 | Switzerland | Apr. 2, 1934 |